Oct. 19, 1965     K. A. MILETTE     3,212,753
WEDGE GATE VALVE

Filed July 26, 1961     3 Sheets-Sheet 1

INVENTOR.
KENNETH A. MILETTE
BY Paul A. Weilein
ATTORNEY

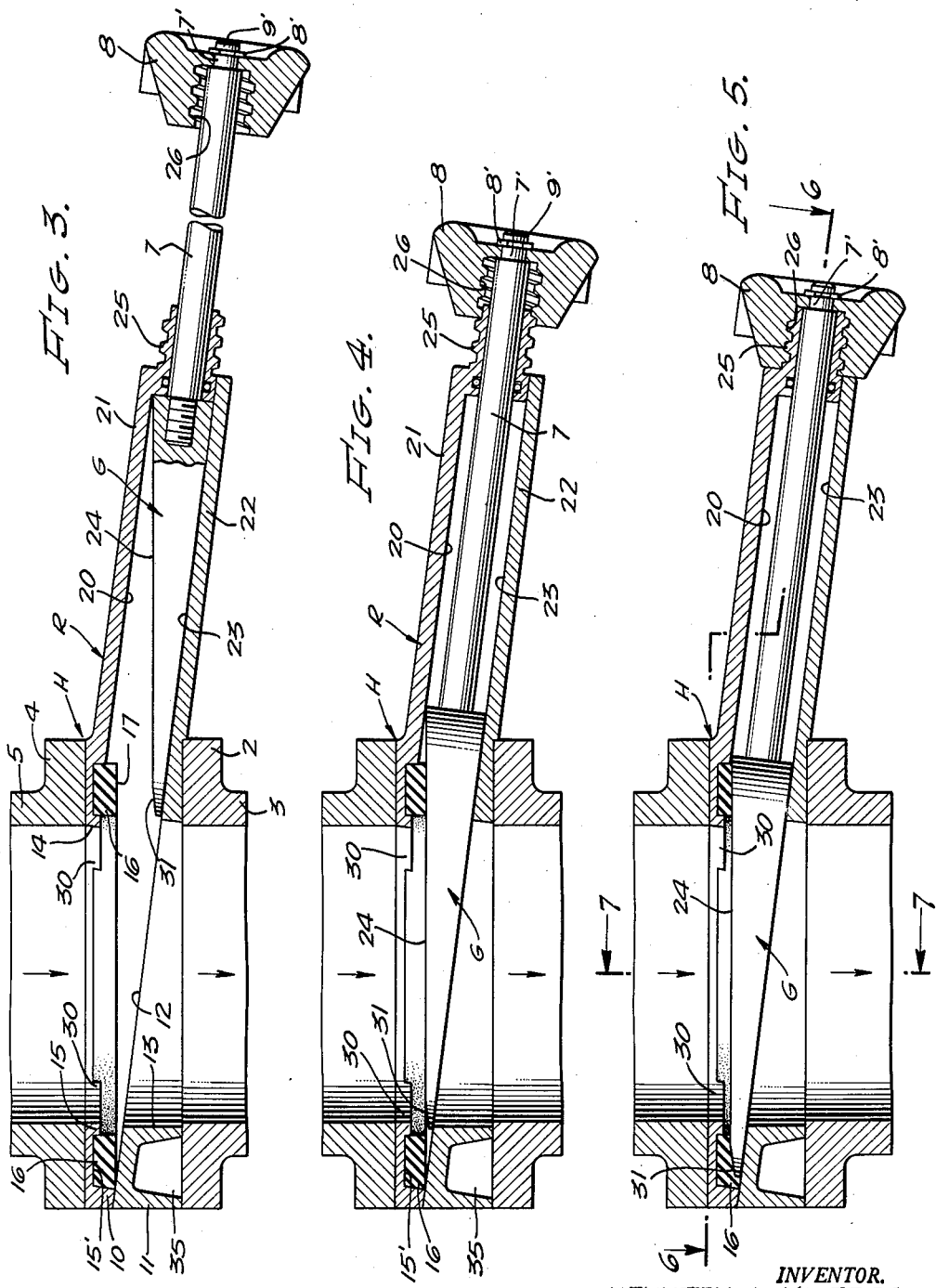

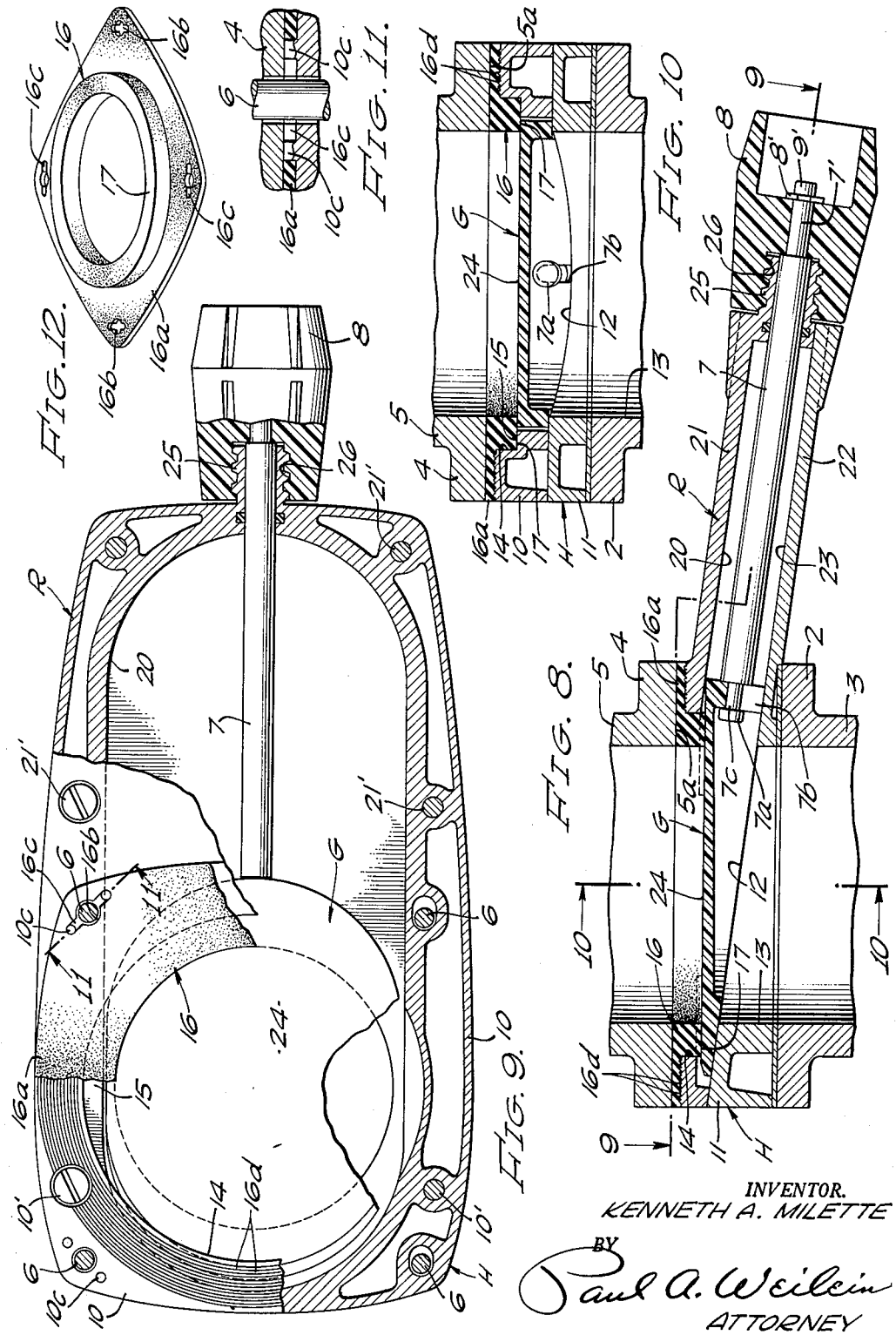

United States Patent Office 3,212,753
Patented Oct. 19, 1965

3,212,753
WEDGE GATE VALVE
Kenneth A. Milette, La Puente, Calif., assignor to Mission-West Manufacturing Company, Los Angeles, Calif., a corporation of Delaware
Filed July 26, 1961, Ser. No. 127,465
11 Claims. (Cl. 251—203)

The present invention relates to gate valves, and more particularly to a novel gate valve construction which has particular utility in installations where space limitations are critical.

This application is a continuation-in-part of my application, Serial No. 41,826, filed July 11, 1960, for Gate Valve, and now abandoned.

Though the novel structural characteristics and advantages of the invention may be availed of in other installations as well, an exemplary application of the gate valve of the invention is to the discharge line from the sewage holding tank of mobile homes or trailers, wherein it is desirable and necessary to provide a positive valve operable to close off the discharge line during transit of the mobile home or trailer, but to allow the line to be opened when connected to a sewage disposal system. Desirably, for practical reasons, such valves are preferably easily manually operated, but must be positive in their sealing action and require but infrequent maintenance or repair. The present invention relates to a gate valve which is extremely well suited to such an environment.

Conventional gate valves include a housing mountable in a flow line and having a flow passage circumscribed by a resilient sealing element. Slidable within the housing and in sealing egagement with the resilient sealing element is a gate which is retractable from a position extending across and closing the flow passage to a position laterally of the flow passage to permit fluid flow through the flow passage. Movement of the gate is restricted by frictional engagement of the gate with the seal so that the gate, particularly in older valve assemblies which have been subjected to the deleterious effects of time and fluids, is not easily shiftable.

An object of the invention is to provide a gate valve wherein the gate throughout the major portion of its travel from a position where the flow passage is open, to a position where the flow passage is closed, is freely slidable and has its sealing face shiftable relative to the resilient sealing element within the valve housing in spaced relation to the sealing element, engaging the latter during the terminal portion of its movement toward a closed position. As a result, the gate valve is freely slidable to a substantially closed position.

A further object is to provide a gate valve construction wherein the valve housing has opposed diverging surfaces circumcsribing the flow passage through the housing and engageable by a tapered gate adapted to be wedged between the diverging surfaces, the housing also having a gate receiver disposed at one side thereof for reception of the gtae when the valve is open. The receiver has a guide surface along which the gate is slidable, this guide surface extending at the same angle relative to the axis of the flow passage through the housing as one of the diverging sealing surfaces, whereby upon movement of the gate from the receiver into wedged relation between the diverging sealing surfaces of the housing, one of the faces of the gate is maintained in parallel relation to the cooperative sealing surface of the housing as the gate moves to a closed position, so that only during the terminal portion of the valve closing motion is there a significant wedging effect of the gate in the diverging opposed sealing surfaces of the housing. With such a construction it is practical to provide operating means for the valve gate which requires very little physical effort to shift the gate throughout the major portion of its travel from full open to full closed positions, and to incorporate in the operating device, means readily operable for affording mechanical advantage in tightly wedging the valve gate into a fully closed position.

Yet a further object of the invention, as more particularly illustrated in one of the embodiments of the invention herein shown, is to provide a gate valve of the type wherein a housing is provided with a surface along which the gate is slidable in generally normal relationship to the axis of the flow passage through the housing and wherein a sealing element circumscribes the flow passage and is engageable by the valve gate, this sealing element having a sealing surface disposed in angular relation to the guide surface for the gate and the sealing element being retained in the housing by means of a detachable member which is removable from the valve housing without requiring disassembly of the latter so that the sealing element may be expeditiously replaced. In such a construction the retaining element for the seal may be in the nature of a flanged coupling or other member which is readily connectible to the valve housing.

Still another object is to provide a sliding gate valve assembly according to the next preceding object wherein the sealing element has formed thereon or made a part thereof a sealing gasket for sealing engagement between the retainer member and the valve housing, so that in one simple operation, i.e. removal of the retainer member, the seal element is exposed so as to be removed and replaced, and upon such replacement, the joint between the housing and the connector is effectively sealed by the sealing element providing the valve seat.

A further object of the invention is to provide a combined sealing element and gasket wherein the gasket is provided with means cooperable with means on at least one of the members between which it is disposed for properly positioning the gasket and the members relative to one another for the reception of fastening means and preferably for limiting compression of the gasket.

Another object of the invention is to provide a gate valve of the aforementioned type which may be readily constructed of die case components if desired.

A further specific object is to provide a gate valve of the aforementioned type, in which a two-part housing provides diverging guide and sealing surfaces engageable by a wedge-shaped gate, the housing parts being separably joined substantially along the plane of one of said surfaces, and the gate being releasably connected to an actuator rod in such a manner that upon partial separation of the housing parts, the gate is removable from the housing so as to enable its replacement without requiring complete disassembly of the latter.

Other objects and advantages of the invention will be hereinafter described or will become apparent to those skilled in the art, and the novel features of the invention will be defined in the appended claims.

In the accompanying drawings:

FIG. 3 is a vertical section view on an enlarged scale as taken on the line 3—3 of FIG. 1, the valve being shown in a full open position;

FIG. 4 is a view corresponding to FIG. 3, but showing the valve in a partially closed condition;

FIG. 5 is a view corresponding to FIG. 3, but showing the valve in a full closed position;

FIG. 8 is a sectional view corresponding to FIG. 5 but illustrating a modified valve seat construction in accordance with the further more specific objects of the invention;

FIG. 9 is a view partly in section and partly in elevation as taken substantially along the line 9—9 of FIG. 8;

FIG. 10 is a transverse sectional view as taken on the line 10—10 of FIG. 8;

FIG. 11 is a fragmentary detail view in section and on an enlarged scale as taken on the line 11—11 of FIG. 9; and FIG. 12 is a detail perspective of the novel combined sealing element and gasket of the modified form of the invention.

Like reference characters in the several views of the drawings and in the following description designate corresponding parts.

Figure 1:
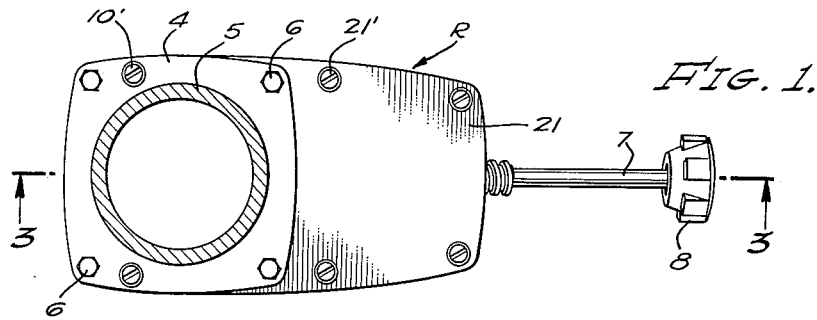
FIG. 1 is a top plan view of the gate valve made in accordance with the present invention, as installed in a line coupling which is partially shown in section.
Figure 2:
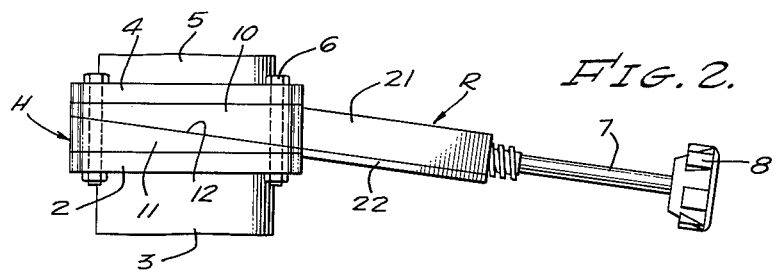
FIG. 2 is a side elevation of the gate valve assembly of FIG 1.

Referring generally to FIGS. 1 and 2, the valve of the present invention is illustrated as embodying a segmental housing generally denoted H, which is disposed in a coupling comprising a flange 2 on a conduit section 3, and a flange 4 on a conduit section 5 secured together by fasteners 6 extending through the flanges 2 and 4, as well as through the housing H. To one side of the housing and coupling, the housing is provided with a receiver generally denoted R from which projects a valve actuator rod 7, having at its outer extremity an operating knob 8. As best illustrated in FIGS. 3 through 5, the segmental housing H includes an upper section 10 and a lower section 11, abutting on a line extending diagonally across the housing and interconnected by fasteners 10'.

The lower housing section 11 has an upper surface 12 extending at an acute angle to a horizontal plane normal to the axis of the conduits 3 and 5. Extending through the housing section 11 is an opening 13 leading to the conduit 3. Extending through the upper housing section 10 is an opening 14 communicating with the conduit 5. The housing section 10 is provided with an inner wall or surface 15, which as here shown, is provided with a recess 15' for the reception of a resilient deformable sealing element 16. The sealing element 16 has a continuous sealing facing 17 which is disposed on a plane normal to the axis of the opening 14 through the housing section 10, and therefore in diverging relation to the face 12 of the lower housing section 11.

A gate valve element G of tapered form is adapted to be shifted along the surface 12 of housing section 11, as progressively illustrated in FIGS. 3 through 5, so as to be brought into wedged sealing relation between the surface 12 of the lower housing section 11 and the face 17 of the sealing element. Accordingly, the gate G is tapered correspondingly to the divergence between the faces 12 and 15 of the housing sections 11 and 10, respectively.

The gate receiver R previously referred to extends from one side of the housing H and is provided with a chamber 20, in which the gate G is shiftably disposed. Preferably, the receiver R is constructed as part of the respective housing sections 10 and 11. Therefore, the receiver R includes an upper receiver section 21 integrally formed with the housing section 10 and a bottom closure section 22 integrally formed with the lower housing section 11. Fasteners 21' are accordingly employed to assist fasteners 10', referred to above, to interconnect the housing and receiver stations together as an assembled unitary housing. The receiver section 22 provides a flat inner guide surface 23, constituting a continuation of the surface 12 of the housing section 11, along which the gate G is slidable. By reason of this construction, it will be noted that as the gate G is moved progressively from the position shown in FIG. 3 to the position shown in FIG. 4, the upper surface 24 of the gate, which is parallel to the sealing face 17 of the sealing element 16, is shifted toward the latter, but does not engage the sealing face 17 until the inner extremity of the gate G has substantially bridged the flow opening through the housing H. Thus, there is no substantial restriction to sliding movement of the gate G from a full open position to a position just prior to its being in a fully closed position.

Means are provided for forcibly shifting the gate G through the terminal portion of its movement to a full closed position. Preferably, this means includes an exteriorly threaded actuator guide 25 integrally or otherwise provided on the outer extremity of the receiver section 21 and the operating knob 8 previously referred to. The knob 8 is provided with an internally threaded bore 26 engageable with the guide 25, as shown in FIG. 4, whereby rotation of the knob 8 will force the gate G from the position shown in FIG. 4 to the full closed position of FIG. 5, thereby deforming the resilient sealing element 16 and effecting a complete seal between the latter and the gate G. The knob 8 is preferably rotatably mounted on the outer extremity of the actuator rod 7 on a reduced portion 7' of the latter, there being a retainer washer 8' secured in place by a cap screw 9' for holding the knob 8 upon the reduced portion 7'.

Figure 6:
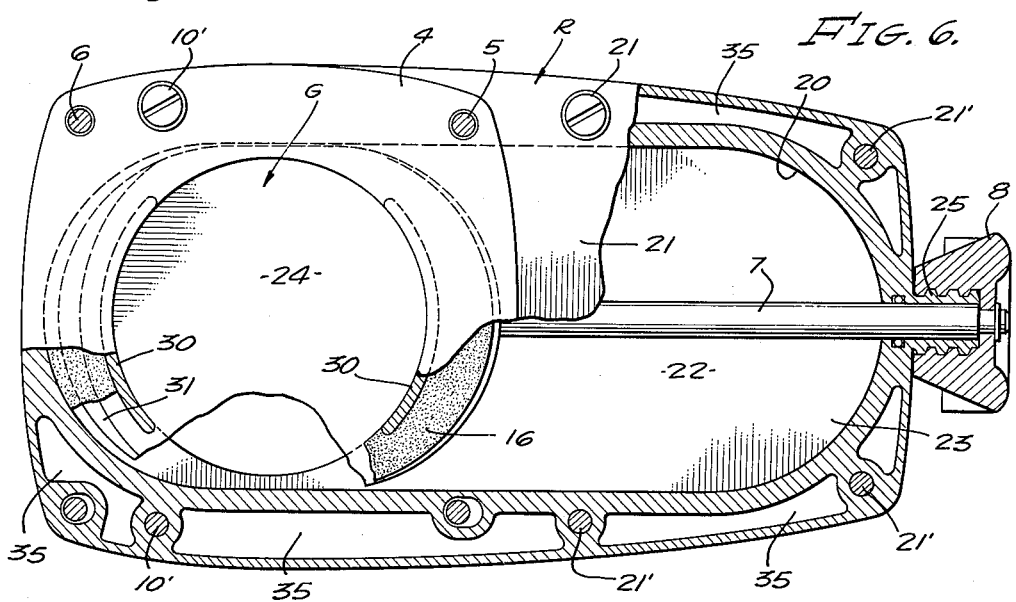
FIG. 6 is a view partly in section and partly in elevation as taken substantially along the line 6—6 of FIG. 5.
Figure 7:
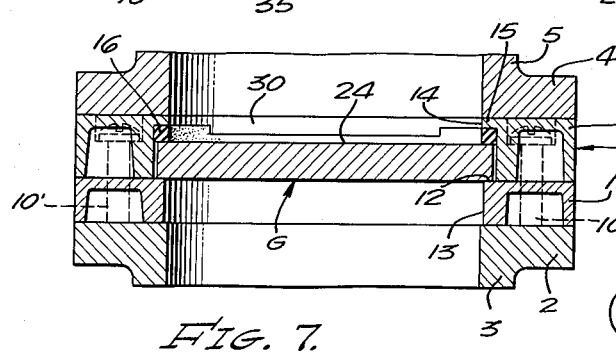
FIG. 7 is a transverse sectional view as taken on the line 7—7 of FIG. 5.

Referring to FIG. 6, it will be noted that the gate G, as well as the sealing element 16, are substantially ovate, and provide relatively broad sealing zones at the opposite ends of the gate. In order to preclude displacement of the sealing element 16 due to frictional engagement therewith of the gate G during the initial and final closing movements of the gate as well as during opening movement of the gate, the housing section 10, as here shown, is provided with downwardly extended arcuate retainer flanges 30, 30. In addition, to avoid substantial interference between the inner extremities of the gate G and the sealing element 16, the gate G is bevelled at 31 throughout the arcuate upper surface region at the outer end thereof which finally engages the sealing element 16 during the terminal portion of movement of the gate G to a full closed position.

From the foregoing it will be recognized that the objectives of the invention have been fully accomplished, and in the practical application of the invention the gate valve assembly including the unitary housing H and gate receiver R, with the gate G therein, may be readily and conveniently installed in a conduit coupling, as herein illustrated, even though space limitations may be severe.

Operation of the gate is quite simple and easy of accomplishment by reason of the fact that the gate is not required to move in sliding frictional engagement with the sealing element, as in conventional gate valves heretofore available.

With the valve in open position, a shown in FIG. 3, the gate G may be manually shifted without requiring complicated operating mechanism, to the position shown in FIG. 4, following which simple rotary motion of the knob 8 will fully close the valve and wedge the gate G between the housing surface 12 and the resilient sealing element 16 to provide an effective sealing action throughout the life of the sealing element. Moreover, the life of the sealing element is materially enhanced by reason of the fact that it is not subjected to wear occasioned by movement of the gate in sliding engagement therewith. Furthermore, by reason of the fact that the housing sections 10 and 11 abut on the diagonal line, and the gate receiver R projects from the housing H at a corresponding angle, manufacture of the unitary housing and receiver components by die casting is facilitated. In the latter connection, the body of the housing and receiver parts may be appropriately formed with cavities, as generally indicated at 35 throughout, for the purpose of effecting reduction in weight and economy of material.

Referring now to FIGS. 8–12 in which the reference characters are the same as those employed in connection with FIGS. 1–7 insofar as the general valve construction is concerned, the slidable gate valve of the invention is illustrated as including a novel sealing element 16 of modified form.

In this modified construction it will be noted that the sealing element or ring 16 projects radially inwardly into the opening 14 through the upper valve housing part 10, so that the sealing surface 17 thereof is exposed for engagement by the upper surface 24 of the valve gate G as shown in FIGS. 8 and 10. The coupling or conduit 5 is provided with a face 5a which opposes the face 24 of valve gate G so as to back up the seal ring 16 whereby to assure an effective sealing action. It will be observed that the sealing ring 16 in this embodiment is adapted to be inserted into the recess 15 of the upper housing part 10 when the coupling or conduit 5 is removed without requiring that the housing part 10 be disassembled from the housing part 11 as in the previously described embodiment. Therefore, upon installation or service of a gate valve in accordance with this embodiment of the invention, the sealing element 16 may be inspected and, if need be, replaced with facility and without requiring disassembly of the valve housing.

In addition, in this embodiment of the invention, the sealing element 16 also provides a seal between the housing part 10 and the coupling or conduit flange 4. In the illustrative embodiment the sealing element is provided or formed with a gasket section 16a projecting outwardly therefrom for engagement between the flange 4 of the coupling or conduit 5 and the upper housing section 10. This gasket 16a is provided with fastener openings 16b through which extend the fasteners 6 which interconnect the conduit or coupling flanges 2 and 4 to the previously assembled housing parts 10 and 11. In order to limit radial extrusion of the gasket 16a, the housing is preferably provided with a plurality of ribs 16d which are generally radially spaced so as to engage and constrain the gasket against extrusion.

Furthermore, in accordance with a feature of this embodiment of the invention, the gasket 16a is provided with means cooperable with the housing part 10 and the coupling or conduit flange 4 so as to properly orient the gasket relative to the housing and so as to properly space the flange 4 relative to the housing to facilitate alignment of the openings through which the tie bolts or fasteners 6 extend and so as to limit compression of the gasket. In this connection, it will be noted that the gasket 16a adjacent the openings 16b therethrough is provided with slots 16c. These slots are adapted to receive a pair of spaced pins or projections 10c on the outer face of the upper housing part 10, as best seen in FIGS. 9 and 11. It will be noted that this cooperative pin and slot coengagement between the housing part 10 and the gasket 16a provides means for properly positioning these parts so as to facilitate assembly of non-circular parts of similar configuration. Hence, in the assembly and maintenance of the gate valve hereof, proper alignment of the parts is assured. In addition, the pins 10c are preferably of such length as to abut with the opposing face of flange 4 of coupling or conduit 5, whereby to limit compression of the gasket.

As previously stated, a feature of the present invention is the ease with which the gate G, as illustrated in the embodiment of FIGS. 8–12, may be removed from the housing without necessitating complete disassembly of the two parts 10 and 11 of the housing H. It will be noted in this connection that the housing parts 10 and 11 are separable substantially along the plane of the guide surface 12. Hence, upon removal of the fasteners 10' and 21' and removal of the fasteners 6, the housing parts 10 and 11 may then be separated. Removal of the retainer 8' from the end of the actuator 7 will allow the gate G to be moved to the left as viewed in FIG. 8, to the extent that the larger end of the gate G will be moved into the flow passage through the housing parts.

At this point, the gate G may be removed from the actuator rod 7 by virtue of the simple detachable connection therebetween which comprises a head 7a on the inner extremity of the actuator 7 and an open ended slot 7b within which fits a stem 7c that interconnects the head 7a with the stem 7c.

While the specific details of two embodiments of the invention have been herein shown and described, changes and alterations may be resorted to without departing from the spirit of the invention as defined in the appended claims.

I claim:

1. A gate valve comprising: a housing; a flow passage through said housing; a gate receiver projecting from one side of said housing; a gate slidable from said receiver into said housing; means for shifting said gate; said receiver and housing having a guide surface inclined relative to the axis of the flow passage and along which said gate is slidable; said housing having a surface normal to said axis and diverging relative to said guide surface; and said gate having divergent surfaces respectively slidable on said guide surface and sealingly engageable with said diverging surface of said housing.

2. A gate valve comprising: a housing; a flow passage through said housing; a gate receiver projecting from one side of said housing; a gate slidable from said receiver into said housing; means for shifting said gate; said receiver and housing having a guide surface inclined relative to the axis of the flow passage and along which said gate is slidable; said housing having a member therein of resilient material provided with a sealing surface normal to said axis and diverging relative to said guide surface; and said gate having divergent surfaces respectively slidable on said guide surface and sealingly engageable with said diverging sealing surface.

3. A gate valve comprising: a housing; a flow passage through said housing; a gate receiver projecting from one side of said housing; a gate slidable from said receiver into said housing; means for shifting said gate; said receiver and housing having a guide surface disposed at an angle to the axis of the flow passage and along which said gate is slidable; said housing having a surface diverging relative to said guide surface; said gate having divergent surfaces respectively slidable on said guide surface and sealingly engageable with said diverging surface of said housing; operating means for said gate including a rod connected to said gate and extending from said receiver; and a pair of cooperable elements on the outer end of said rod and the exterior of said receiver movable into and from engagement with one another and operable when engaged for forcing said gate into engagement with said diverging surface of said housing.

4. A gate valve comprising: a housing; a flow passage through said housing; a gate receiver projecting from one side of said housing; a gate slidable from said receiver into said housing; means for shifting said gate; said housing including a pair of sections joined together on a plane disposed at an acute angle to a horizontal plane normal to the axis of the flow passage; one of said sections and said receiver having a gate guide surface extending from said housing at said acute angle; the other section having a surface diverging from said guide surface; and said gate being wedge-shaped and slidable on said guide surface into engagement with said diverging surface to close said flow passage.

5. A gate valve comprising: a housing; a flow passage through said housing; a gate receiver projecting from one side of said housing; a gate slidable from said receiver into said housing; means for shifting said gate; said housing and said receiver including a pair of unitary sections joined together on a plane disposed at an acute angle to a horizontal plane normal to the axis of the flow passage; said sections having opposed first portions in said housing and opposed second portions projecting from said housing; the first and second portions of one of said sections having a gate guide surface disposed at said angle of the juncture of said sections; the first portion of the other section having a surface diverging from said guide surface; and said gate being wedge-shaped and slidable on said guide surface into engagement with said diverging surface to close said flow passage.

6. A gate valve comprising: a housing having a flow passage therethrough; a structure having a pair of opposed portions forming parts of said housing; said structure having a gate supporting portion joined to and extending outwardly from one of said opposed portions and providing therewith a guide surface inclined relative to said flow passage; a deformable sealing member carried by the other of said opposed portions and circumscribing said flow passage and having a sealing surface diverging relative to said guide surface; a gate slidable on said guide surface and having opposed faces diverging at substantially the angle of divergence of said sealing surface and said guide surface; and means for shifting said gate along said guide surface across said flow passage.

7. A gate valve comprising: a housing having a flow passage therethrough; a structure having a pair of opposed portions forming parts of said housing; said structure having a gate supporting portion joined to and extending outwardly from one of said opposed portions and providing therewith a guide surface inclined relative to said flow passage; a deformable sealing member carried by the other of said opposed portions and circumscribing said flow passage and having a sealing surface diverging relative to said guide surface; a gate slidable on said guide surface and having opposed faces diverging at substantially the angle of divergence of said sealing surface and said guide surface; and means for shifting said gate along said guide surface across said flow passage; said gate having an advancing edge which is bevelled so as to deform said sealing member as the gate is closed.

8. A gate valve comprising: a housing having a flow passage therethrough; a structure having a pair of opposed portions forming parts of said housing; said structure having a gate supporting portion joined to and extending outwardly from one of said opposed portions and providing therewith a guide surface inclined relative to said flow passage; a deformable sealing member carried by the other of said opposed portions and circumscribing said flow passage and having a sealing surface diverging relative to said guide surface, a gate slidable on said guide surface and having opposed faces diverging at substantially the angle of divergence of said sealing surface and said guide surface; means for shifting said gate along said guide surface across said flow passage; and a flange at opposite sides of the flow passage engaged with said sealing member to resist displacement of said sealing element upon movement of said gate while engaged therewith.

9. A gate valve comprising: an elongated housing having a flow passage therethrough; said housing having diverging opposed surfaces extending about said flow passage engageable with said gate; a gate receiver to one side of said housing inclined relative to the axis of said flow passage and having a correspondingly inclined gate chamber provided with a guide surface diverging relative to one of said opposed surfaces; a gate slidable in said receiver along said guide surface form a position sealingly engaged with said opposed surfaces to a position within said chamber; said gate having opposed diverging faces corresponding to said opposed surfaces; and means for shifting said gate between said positions.

10. A gate valve comprising: a housing, a receiver to one side of said housing; said housing and said receiver having a guide surface; a valve gate slidable in said housing and receiver along said guide surface and having a sealing surface diverging relative to said guide surface; said housing and said receiver including a pair of unitary sections joined together on the plane of said guide surface; said sections having opposed openings forming a flow passage, the axis of which is normal to the plane of said sealing surface; and sealing means in said housing having a sealing surface diverging relative to said guide surface and engageable by said sealing surface of said gate; portions of said section being inclined relative to and extending outwardly from one side of said flow passage.

11. A gate valve comprising: a housing; a receiver to one side of said housing; said housing and said receiver having a flow passage and a guide surface; said guide surface surrounding said flow passage and being inclined relative to the axis of said flow passage; said receiver being also inclined relative to said axis; a valve gate slidable in said housing and receiver along said guide surface and having a sealing surface diverging relative to said guide surface; sealing means in said housing having a sealing surface diverging relative to said guide surface and engageable by said sealing surface of said gate; said sealing means comprising a resilient seal ring; and means exteriorly of said housing removably securing said seal ring in said housing.

References Cited by the Examiner

UNITED STATES PATENTS

| Re. 19,151 | 5/34 | Saunders | 251—331 |
|---|---|---|---|
| 367,327 | 7/87 | Titcomb | 251—227 X |
| 1,720,938 | 7/29 | Veenschoten | 251—326 |
| 1,751,122 | 3/30 | Barker | 251—328 X |
| 2,001,094 | 5/35 | Cuttle | 251—203 |
| 2,194,261 | 3/40 | Allen | 251—328 |
| 2,592,953 | 4/52 | Roberts | 251—203 |
| 2,614,792 | 10/52 | Trefil | 251—203 |
| 2,636,713 | 4/53 | Hamer | 251—328 X |
| 2,659,565 | 11/53 | Johnson | 251—331 |
| 2,678,802 | 5/54 | Adams | 251—328 |
| 2,732,170 | 1/56 | Shand | 251—328 X |
| 2,893,684 | 7/59 | Williams | 251—328 |
| 2,969,083 | 1/61 | Joyce | 251—147 X |

FOREIGN PATENTS 779,644  7/29  France.

ISADOR WEIL, *Primary Examiner.*

M. CARY NELSON, *Examiner.*